United States Patent [19]

Kunugihara et al.

[11] Patent Number: 5,366,515
[45] Date of Patent: Nov. 22, 1994

[54] METHOD OF ELECTRICALLY AGING AN ELECTRONIC COMPONENT

[75] Inventors: Hiromu Kunugihara, Kyoto; Tooru Yamaguchi, Uji; Gousuke Mieno; Junkichi Kawamura, both of Kyoto; Akiyoshi Asou, Osaka; Tsutomu Sakashita; Toshiyuki Hata, both of Uji; Tetsuya Nakamura, Kyoto, all of Japan

[73] Assignee: Matsushita Electric Industrial Co., Ltd., Osaka, Japan

[21] Appl. No.: 998,544

[22] Filed: Dec. 30, 1992

[51] Int. Cl.⁵ .............................................. H01G 9/00
[52] U.S. Cl. ................................ 29/25.03; 324/158.1; 324/548; 320/1
[58] Field of Search ................. 29/25.03, 25.02, 25.01; 324/519, 522, 523, 548, 158 R; 307/109, 110; 320/1; 429/90, 91, 92, 93; 361/517, 518, 519, 520, 521

[56] References Cited

U.S. PATENT DOCUMENTS

| | | | |
|---|---|---|---|
| 2,472,814 | 6/1949 | Elliott | 324/548 |
| 3,434,029 | 3/1969 | Ackermann | 320/1 |
| 3,878,440 | 4/1975 | Ando | 361/521 |
| 4,364,163 | 12/1982 | Schmidt | 29/25.03 |
| 4,403,393 | 9/1983 | Giacomello | 29/25.03 |
| 4,745,521 | 5/1988 | De Lima Filho | 361/521 |

FOREIGN PATENT DOCUMENTS 63-262571 10/1988 Japan ..................................... 324/548

Primary Examiner—Brian E. Hearn
Assistant Examiner—Kevin Picardat
Attorney, Agent, or Firm—Ratner & Prestia

[57] ABSTRACT

An electrolytic capacitor having a capacitor element which includes a plurality of foils, and having also an electrolyte, wherein the plurality of foils and the electrolyte are contained in a cylindrical case having on one of its end surfaces a pair of lead terminals to connect to the capacitor element and on another of its end surfaces an explosion preventive vent is electrically aged. The electrolytic capacitor is placed onto a support table so that the capacitor's end surface having the lead terminals is not below the capacitor's end surface having the explosion preventive vent. Each one of the pair of lead terminals is connected to a respective one of a pair of electrode sections. An electric voltage is then applied across the pair of lead terminals through the pair of electrode sections.

16 Claims, 3 Drawing Sheets

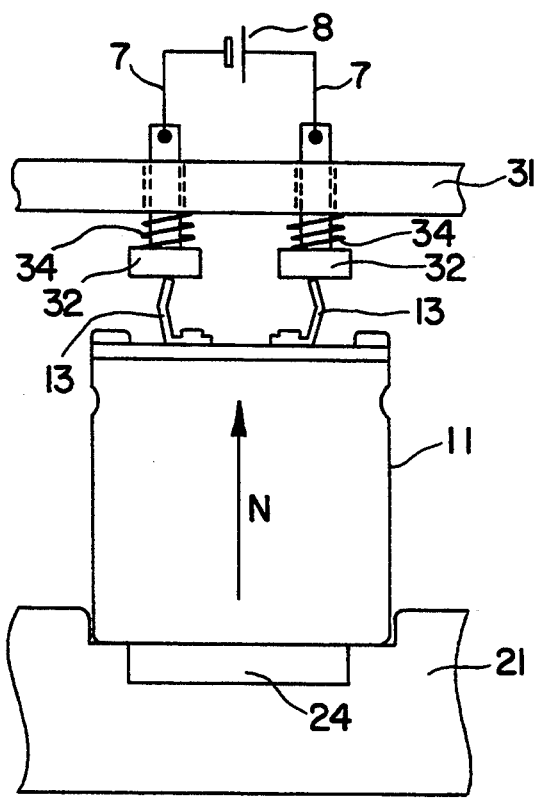
F I G. 3
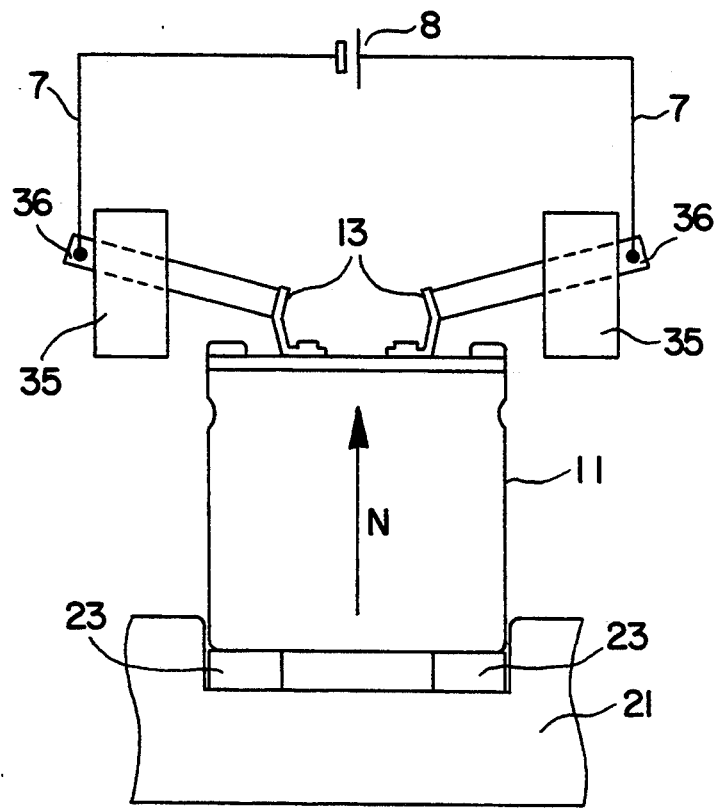
F I G. 4

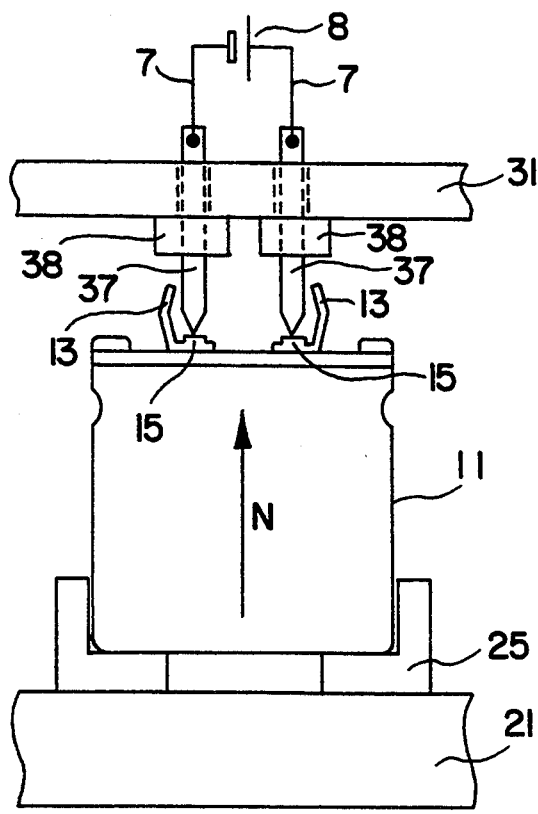
F I G. 5
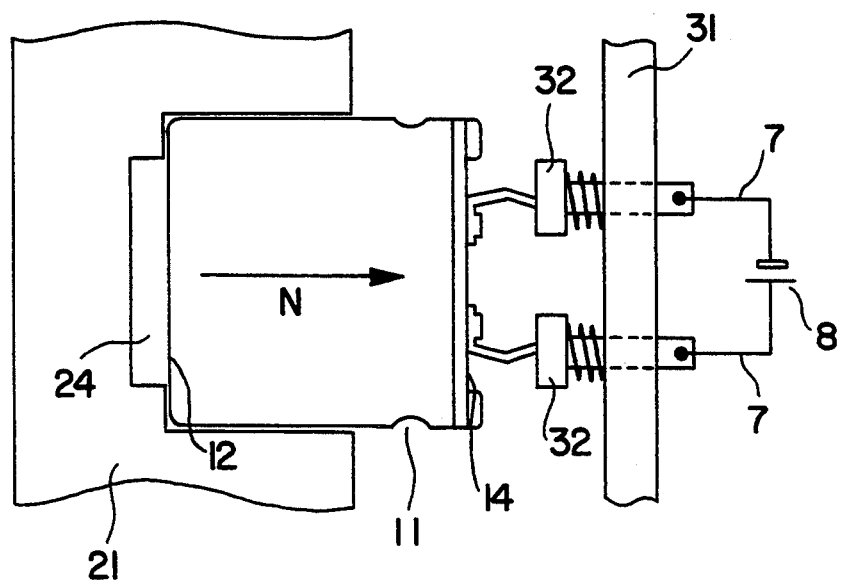
F I G. 6

METHOD OF ELECTRICALLY AGING AN ELECTRONIC COMPONENT

FIELD OF THE INVENTION

This invention relates to a method of electrically aging an electronic component having a pair of lead terminals.

BACKGROUND OF THE INVENTION

An aluminum electrolytic capacitor is commonly produced as follows:

A capacitor element is prepared by winding an aluminum foil. The capacitor element is then impregnated with a driving electrolyte.

The capacitor element is next placed in a cylindrical case, which is made of metals such as aluminum, etc. and which has one end left open. The open end of the case is covered by a disc having a pair of lead terminals and is then sealed.

During the foregoing assembly process, the capacitor element is connected electrically to the pair of lead terminals.

On the other case end (opposite to the open end) a pattern such as an X letter, a Y letter, etc., is cut to serve as an explosion preventive vent.

After assembly of the aluminum electrolytic capacitor has been completed, the capacitor is subjected to an aging process wherein an electric voltage is applied across the pair of lead terminals. In this manner, the capacitor performance is stabilized and also defects such as an internal short circuits, etc., if any, are uncovered prior to shipment.

The aging process has been conducted, as illustrated in FIG. 1(a), with an aluminum electrolytic capacitor 1 supported vertically with one end 2 having an explosion preventive vent positioned at the upper side and another end 4 having lead terminals 3 positioned at the lower side, the pair of lead terminals 3 is inserted to and held by a mating pair of metal clips 6 which are mounted on a support table 5 and made of an elastic electrode material. An electric voltage from a power source 8 is applied to the lead terminals 3 through lead wires 7 which are connected to the clips 6.

This aging process has been employed widely and commonly for the reasons that mounting and removing of the aluminum electrolytic capacitor 1 to and from the support table 5 is easily achieved, especially when done by hand.

However, the conventional aging method of the foregoing has several problems:

One of the problems is contamination of the clips 6. Contamination may be caused by the driving electrolyte flowing out of the case end 2 broken along the cut 9 that was provided as an explosion preventive vent as illustrated in FIG. 1(b). If internal shortcircuiting takes place during the course of aging, electrolyte may flow out of the explosion preventive vent on the case end 2, along the side of the capacitor 1, and down to the clips 6.

An insulating oxide film is formed on the surface of the clips 6 by a reaction between the electrolyte and the clips 6 with a resultant interruption of voltage application to the lead terminals 3 through the clips 6. Thus, the next time an aging process is applied to an aluminum electrolytic capacitor using the contaminated clips 6 coated with the oxide film, aging does not occur.

Thus, once an oxide film is formed on the clips 6, the clips cannot be used again and every time the explosion preventive vent operates, the clips 6 have to be checked (and sometimes replaced) resulting in the necessity of frequent maintenance of the aging equipment and an adverse effect to productivity.

Another defect is the likelihood of a solder layer that was formed by plating on the surface of the lead terminals 3 to be peeled off when the aluminum electrolytic capacitor 1 is mounted on or removed from the clips 6.

This causes a poor connection between the capacitor lead terminals having the plated solder layer peeled off of the surface and the circuit pattern of a printed wiring board when the aluminum electrolytic capacitor is mounted on the printed wiring board by soldering.

Particularly with an aluminum electrolytic capacitor of shorter lead terminal type that was recently put to a practical usage, the gripping force of the clips is intensified to prevent the capacitor from falling off of the clips due to the shorter lead terminals. Intensification of the gripping force may result in peeling of the solder layer formed by plating on the surface of the lead terminals.

Relating to the type of aluminum electrolytic capacitor having a shorter lead terminal, the height of the lead terminals measured from the surface of the capacitor end does not exceed 4.5 mm, in contrast to the conventional ordinary capacitor which has a height of about 6.3 mm.

When the conventional capacitor is mounted on a printed circuit board, the tips of the lead terminals protrude from the bottom surface of the board requiring an extra process of shortening the protruding tips of the lead terminals. With the capacitor of shorter lead terminal type, the tips of the lead terminals do not protrude from the bottom surface of the board, eliminating the necessity of the extra process of shortening the protruding tips of the lead terminals. As a result, more of the aluminum electrolytic capacitors of shorter lead terminal type are recently being used as the most suitable capacitors for mounting on printed wiring boards.

Another problem relates to a difficulty in automating the mounting and removing of the lead terminals to and from the clips since a certain appropriate force is required for performing the aforementioned operations by machine although they are easily performed by hand.

SUMMARY OF THE INVENTION

A method is provided for the aging of an electronic component in order to achieve high productivity, a reduction in aging defects and a prevention of the solder plate layer from peeling off of the capacitor's lead terminals.

The method of electrically aging an electronic component in accordance with the present invention comprises the steps of:

(a) placing a component on a support means;
(b) connecting each one of the pair of lead terminals to a respective one of a pair of electrode sections; and
(c) applying an electric voltage across the pair of lead terminals through the pair of electrode sections, wherein each of the electrode sections provides a force for maintaining contact with each of the lead terminals and wherein each of the electrode sections does not provide a counter force opposite to the force for maintaining contact with each of the lead terminals.

According to this method, since a connection method of pressing the electrode sections onto the lead terminals is employed, the surfaces of the lead terminals will not be damaged or the plated solder layer formed on the lead terminals will not be damaged or the plated solder layer formed on the lead terminals will not be peeled off, either, as often observed before.

The effect of preventing the solder layer from peeling off is particularly significant when the aging method according to the present invention is used with an aluminum electrolytic capacitor of the short lead terminal type.

Also, the problem of aging defects caused by a disengagement of lead terminals from clips due to the short length of the lead terminals during the course of aging, as often experienced in the past with electrolytic capacitors of short lead terminal type, is solved.

In addition, according to the method of the present invention, placing or removing of an electronic component onto or from a support table is performed easily, without requiring much force. Therefore, the aging process can be readily automated by using machines.

BRIEF DESCRIPTION OF THE DRAWINGS

FIGS. 2 to 6 are illustrations to explain modes 1 to 5 of this invention's method of aging an aluminum electrolytic capacitor respectively.

DESCRIPTION OF THE PREFERRED EMBODIMENTS

Figure 2:
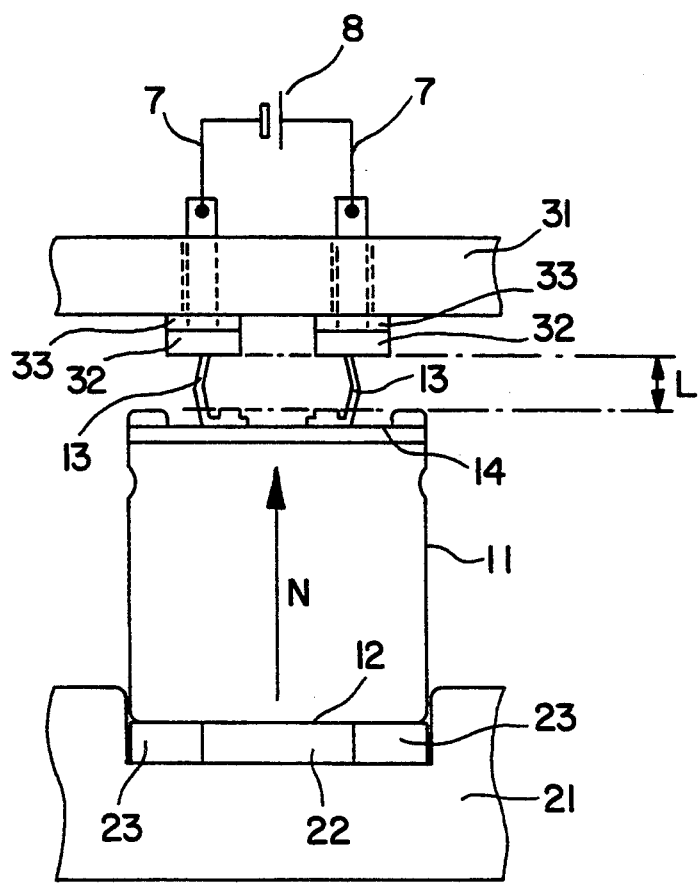

Mode 1 of this invention's method is explained with the help of FIG. 2 as follows:

First, a cylindrical aluminum electrolytic capacitor of short lead terminal type 11 is placed on an elastic rubber 23 having a rebound elastic modulus of 10–100%, which is installed in a hollow 22 of a horizontally positioned support table 21 in such a way that its normal line direction N of the end surface 14, pointing from one end surface 12, where an explosion preventive vent is formed to the other end surface 14, where a pair of lead terminals 13 is mounted, becomes parallel with the direction perpendicular to the horizontal plane (a direction from the ground to the sky).

Next, the flat tip surface of a pair of copper electrode sections 32 are made to contact with the tips of the lead terminals 13. At this time, the lead terminals 13 and the electrode sections 32 are positively pressed together at their contacting surfaces by elastic forces applied through elastic rubbers 33 incorporated with the electrode sections 32 and the elastic rubbers 23 installed on the support table 21.

Then, an electric voltage is applied from a power source 8 to the lead terminals 13 to age electrolytic capacitor 11. The lead terminals 13 as illustrated in FIG. 2 look like a pair of bull horns and are commonly referred to as a snap-in type. They typically measure 4.0±0.5 mm in height L.

In this mode 1, the lead terminals and the electrode sections 32 are kept in an electrically surest contacting state due to a pressure exerted to their contact surfaces through the elastic rubbers 23 and 33. In particular, the existence of the elastic rubbers 33 incorporated with the electrode sections 32 makes a sure contact possible between the electrode sections 32 and the lead terminals 13 even when there is a slight difference in the height L between the pair of the lead terminals 13. Besides, the flat tips of the electrode sections 32 make it possible to eliminate the necessity of exact positioning between the lead terminals 13 and the electrode sections 32 since shifting of the lead terminal tip position on the flat surface of the electrode section tip does not adversely affect the electrical contacting conditions between the two tips.

Mode 2 of the present invention is a modification of the mode 1 as illustrated in FIG. 3. What differs from the mode 1 is the elimination of the elastic rubber 23 of FIG. 2, the replacement of the hollow 22 of FIG. 2 with a stepped hollow 24, and the replacement of the elastic rubbers 33 incorporated with the electrode sections 32 of FIG. 2 with coil springs 34, each having a spring force of 100–600 gf. Even with the elastic bodies for a pressure application incorporated only with the electrode sections 32, a secure contact between the lead terminals 13 and the electrode sections 32 is maintainable. In particular, employing spring coils 34 provides for sufficient contact maintained between the lead terminals 13 and the electrode sections 32 due to the wide elasticity range of spring coils even when there is a height difference as large as 1 mm between the lead terminals 13.

Mode 3 of the present invention is a modification of the mode 1 as illustrated in FIG. 4 and employs a method of making contact between each respective side of the tips of the snap-in type lead terminal pair 13 and each of the electrode section pair 36, which is supported by a supporting means 35 formed of copper and has a bar like configuration. With this mode, the positional adjustment between the lead terminals 13 and the electrode sections 36 is performed relatively easily since the contact between the two is made at a side of one of the lead terminals 13. Besides, since the lead terminals 13 possess some elasticity, an incorporation of elastic bodies with the electrode sections 36 is not necessarily required.

Mode 4 of the present invention is a modification of the mode 1 as illustrated in FIG. 5. With the set-up of this mode, an aluminum electrolytic capacitor 11 is placed on an elastic rubber 25 which has an L shaped cross-section and is sitting on a flat support table 21 and a pair of electrode sections 37, each pinpointed tip of which is held by an elastic rubber 38, is made to contact with the rivets 15 of the lead terminals 13. This method is suitable when the mechanical strength of the lead terminals 13 is weak.

Mode 5 of the present invention includes a change in the mounting position of an aluminum electrolytic capacitor from the preceding modes as illustrated in FIG. 6. With this mode 5, the electrolytic capacitor 11 is subjected to aging with its normal line direction N as defined with the aluminum electrolytic capacitor 11 of the mode 2 in FIG. 3 positioned in parallel with the horizontal plane. In this case, there is no electrolyte reaching the electrode sections 32 with a resultant elimination of the possibility of the electrode section oxidation even when the electrolyte flows out of the end surface 12 as a result of operation of the explosion preventive vent.

Exemplary embodiments of the present invention are presented in the following.

In the above-mentioned modes, each of the electrode sections provides a force for maintaining contact with each of the lead terminals and wherein each of the electrode sections does not provide a counter force opposite to the force for maintaining contact with each of the lead terminals.

This method can be applied not only to capacitors but to other kinds of electronic components such as resistors, integrated circuits and large scale integrated devices.

EXAMPLE 1

Figure 1A:
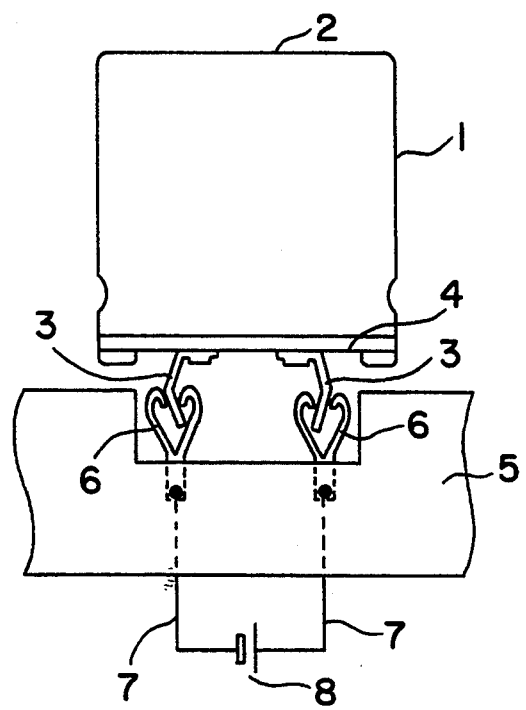
FIG. 1(a) is an illustration which is useful for explaining a conventional method of aging an aluminum electrolytic capacitor and FIG. 1(b) is a plan view of one of the ends of the aluminum electrolytic capacitor.
Figure 1B:
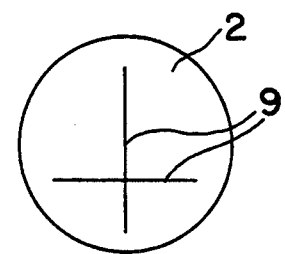

Snap-in type aluminum electrolytic capacitors of 200 WV and 470 μF before aging were prepared in the quantity of 200. These capacitors were of short terminal type and had a lead terminal height of 4±0.5 mm. Capacitors in the quantity of 100 out of the foregoing were subjected to aging according to the aforementioned mode 1 as illustrated in FIG. 2. The remaining capacitors in the quantity of 100 were subjected to aging according to the conventional method as shown in FIG. 1. In addition, the capacitors were connected to an electric source capable of supplying 360 V per capacitor and 10mA at which the explosion preventive vent operates in order to see the adverse effect of the driving electrolyte extended over the electrode sections.

After this, the oxidation condition of the electrode sections contaminated by the leaked driving electrolyte was checked. Oxide films were not formed on the electrode sections when the exemplary embodiment of the present invention was practiced while 9 pairs of the electrode sections were found contaminated when the conventional method was used.

EXAMPLE 2

Electrolytic capacitors before aging of the same kind as used in Example 1 were prepared in the quantity of 200. Then, in the same manner as in Example 1, the capacitors in the quantity of 100 were subjected to aging according to the mode 1 method and the remaining 100 capacitors were aged according to the conventional method. All these capacitors were connected to an electric source capable of supplying a normal voltage of 250 V per capacitor and a normal current of 10 mA.

After this aging process, aging defects due to incomplete contacts between the lead terminals and the electrode sections and the like were checked by measuring magnitudes of leakage currents and also peeling of the plated solder coating off the lead terminals was checked.

As a result, it was found that the capacitors treated by aging according to the exemplary embodiment of the present invention did not indicate any aging defects or any solder coat peeling at all, while the capacitors aged according to the conventional method showed 15 of them having aging defects and 22 of them having solder coat peeling.

As clarified in the foregoing, according to the aging method in accordance with the present invention, there is no danger of oxidation of electrode sections even if driving electrolyte flows out. Consequently, there is no need to frequently change the electrode sections with a resultant improvement in productivity. Besides, electrical connections are performed by pressing electrode sections onto lead terminals and there is no danger of the solder coat layer peeling off of the lead terminals and also there is no danger of the lead terminals disengaging from the clips.

Moreover, the present invention is not limited to the embodiments and the examples of the foregoing wherein electrolytic capacitors are placed on the support table with the normal line direction positioned either vertical to or in parallel with the horizontal plane. The capacitors can be placed so that the direction of the normal line is positioned anywhere between the direction vertical to and that in parallel with the horizontal plane. Even under the aforementioned conditions, the driving electrolyte does not reach out to the electrode sections of the capacitors as long as the end of the capacitor having the lead terminals is not below the capacitor's end surface having the explosion preventive vent.

The pressing means are not limited to the aforementioned elastic rubbers and coil springs. Other elastic bodies such as elastic resins, bow-shaped sheet springs and the like can also be used. The pressing means is not necessarily incorporated with both the electrode sections and the support table that holds aluminum electrolytic capacitors, but it can be incorporated with either one only. In addition, the weight of those electrode sections and the associated supportive means thereof can replace the pressing means, provided the mass thereof is appropriately large.

The material of the electrode sections can be such electroconducting materials as copper alloy, aluminum, aluminum alloy, carbon, electro-conducting resin, electro-conducting rubber and the like besides the copper previously mentioned. When an electrode-conducting elastic body is used in the electrode sections, the elastic body to be incorporated with the electrode sections can be eliminated.

The shape of the electrode section tips to make contact with the lead terminals need not necessarily be flat or pinpointed as in the foregoing, but can be semispheric or thin rod like as far as being suitable for the lead terminal configuration and the place of contacting with the lead terminals.

The electrolytic capacitors as used in the foregoing embodiments and examples were incorporated with the lead terminals that are referred to as snap-in type terminals, but the exemplary methods of the present invention can be applied to aluminum electrolytic capacitors of other types of lead terminals such as plate type, rod type and the like. Also, exemplary methods according to the present invention can be used with electrolytic capacitors having the height of the lead terminals not exceeding 4.5 mm, as well as with ones with the lead terminal height exceeding 4.5 mm (such as approximate 6.3 mm and the like). Further, in connection with explosion preventive vents, the exemplary methods according to the present invention can be applied to electrolytic capacitors having an explosion preventive vent of a construction which has a hole bored in the case's end surface and sealed with a material of weak mechanical strength, in addition to the construction of forming cutting slots on the case's end surface of the electrolytic capacitors as used in the foregoing embodiments and examples.

What is claimed is:

1. A method of electrically aging an electronic component having a pair of lead terminals comprising the steps of:

(a) placing said component on a support means;
   (b) connecting each one of said pair of lead terminals to a respective one of a pair of electrode sections; and
   (c) applying an electric voltage across said pair of lead terminals through said pair of electrode sections, wherein each of said electrode sections provides a force for maintaining contact with each of said lead terminals and wherein each of said electrode sections does not provide a counter force opposite to said force for maintaining contact with each of said lead terminals.

2. A method of electrically aging an electronic component according to claim 1, wherein at least either said support means or said electrode sections being equipped with pressure application means for generating said force.

3. A method of electrically aging an electronic component according to claim 2, wherein said pressure application means comprises an elastic body.

4. A method of electrically aging an electronic component according to claim 3, wherein, said elastic body comprises a rubber material.

5. A method of electrically aging an electronic component according to claim 2, wherein said pressure application means comprises a coil spring.

6. A method of electrically aging an electronic component according to claim 1, wherein each one of said pair of lead terminals includes a tip portion for making contact with a flat surface included in said respective one of said pair of electrode sections.

7. A method of electrically aging an electronic component according to claim 1, wherein said electrode sections, each of which has a rod like configuration with its diameter made smaller near the point of contact with each of rivets of said lead terminals.

8. A method of electrically aging an electrolytic capacitor having a capacitor element and an electrolyte, wherein said capacitor element and said electrolyte are contained in a case having on one of its end surfaces a pair of lead terminals to connect to said capacitor element and on another of its end surfaces an explosion preventive vent, said method comprising the steps of:
 (a) placing said electrolytic capacitor onto a support means so that the end of the capacitor having the lead terminals is not below the capacitor's end surface having the explosion preventive vent;
 (b) connecting each one of said pair of lead terminals to a respective one of a pair of electrode sections; and
 (c) applying an electric voltage across said pair of lead terminals through said pair of electrode sections.

9. A method of electrically aging an electrolytic capacitor according to claim 8, wherein said electrolytic capacitor is placed onto a support means and wherein at least eitehr said support means or said electrode section being equipped with pressure application means for connecting each one of said pair of lead terminals to said respective one of said pair of electrode sections.

10. A method of electrically aging an electrolytic capacitor according to claim 9, wherein said pressure application means comprises a elastic body.

11. A method of electrically aging an electrolytic capacitor according to claim 10, wherein said elastic body each comprises rubber material.

12. A method of electrically aging an electrolytic capacitor according to claim 9, wherein said pressure application means comprises a coil spring.

13. A method of electrically aging an electrolytic capacitor according to claim 8, wherein each one of said pair of lead terminals includes a tip portion for making contact with a flat surface included in said respective one of said pair of electrode sections.

14. A method of electrically aging an electrolytic capacitor according to claim 8, wherein each one of said pair of electrode sections has an elongated configuration with a diameter which is smaller closer to a point of contact with said respective one of said pair of lead terminals.

15. A method of electrically aging an electrolytic capacitor according to claim 8, wherein each of said pair of lead terminals has a height of 4.5 mm maximum measured from the end surface of said capacitor where the lead terminals are mounted than further away.

16. A method of electrically aging an electrolytic capacitor having a capacitor element and an electrolyte, wherein said capacitor element and said electrolyte are contained in a case having on one of its end surfaces a pair of lead terminals to connect to said capacitor element and on another of its end surfaces an explosion preventive vent, said method comprising the steps of:
 (a) placing said electrolytic capacitor on to a support means so that the end of the capacitor having the lead terminals is not below the capacitor's end surface having the explosion preventive vent;
 (b) connecting each one of said pair of lead terminals to a respective one of a pair of electrode sections; and
 (c) in the placement set forth in subparagraphs (a) and (b), applying an electric voltage across said pair of lead terminals through said pair of electrode sections, wherein each of said electrode sections provides a force for maintaining contact with each of said lead terminals and wherein each of said electrode sections does not provide a counter force opposite to said force for maintaining contact with each of said electrode.

* * * * *